May 13, 1941.    J. PLEBANSKI    2,241,615

ELECTRIC PHASE CONTROL SYSTEM

Filed Feb. 24, 1940    2 Sheets-Sheet 1

INVENTOR
JOZEF PLEBANSKI
BY
ATTORNEY

May 13, 1941.  J. PLEBANSKI  2,241,615

ELECTRIC PHASE CONTROL SYSTEM

Filed Feb. 24, 1940  2 Sheets-Sheet 2

INVENTOR
JOZEF PLEBANSKI
BY
ATTORNEY

Patented May 13, 1941

2,241,615

UNITED STATES PATENT OFFICE 2,241,615

ELECTRIC PHASE CONTROL SYSTEM

Jozef Plebanski, Warsaw, Poland, assignor to Radio Patents Corporation, a corporation of New York Application February 24, 1940, Serial No. 320,725
In Poland February 25, 1939

10 Claims. (Cl. 178—44)

The present invention relates to apparatus for and a method of controlling the phase of an alternating current or potential for use in both high and low frequency systems.

An object of the invention is to provide a phase shifting device capable of changing the phase of an alternating current between 0 and 360° while maintaining the amplitude of the current substantially constant.

Another object is the provision of a system for comparing the phase difference between two alternating currents or potentials.

Another object is to provide a phase splitting system for producing potentials or currents having a predetermined phase relation with respect to each other.

Still another object is the provision of a goniometer arrangement constructed on the principle of the invention and suited for use in connection with antennae systems for directionally transmitting or receiving radio signals.

Figure 1:
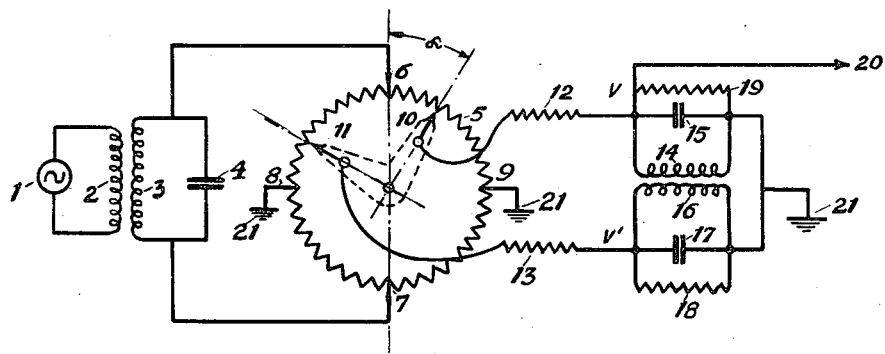
Figure 2:
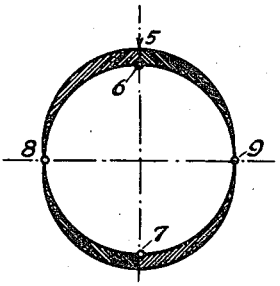
Figure 3:
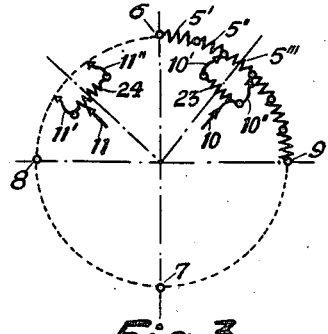
Figure 4:
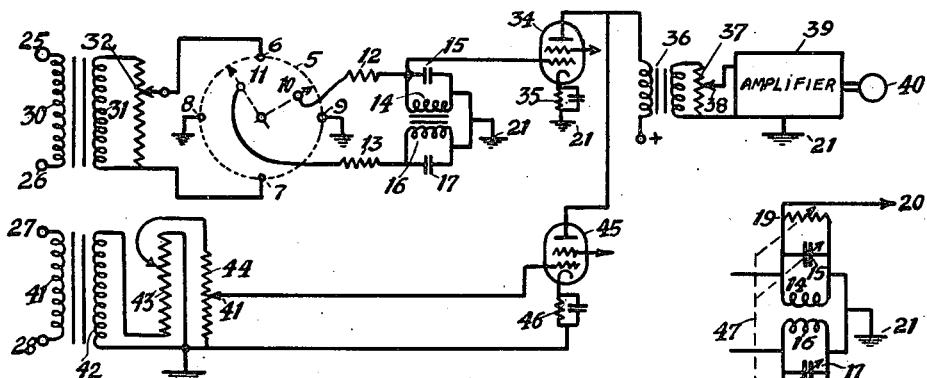
Figure 5:
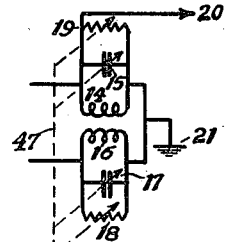
Figure 6:
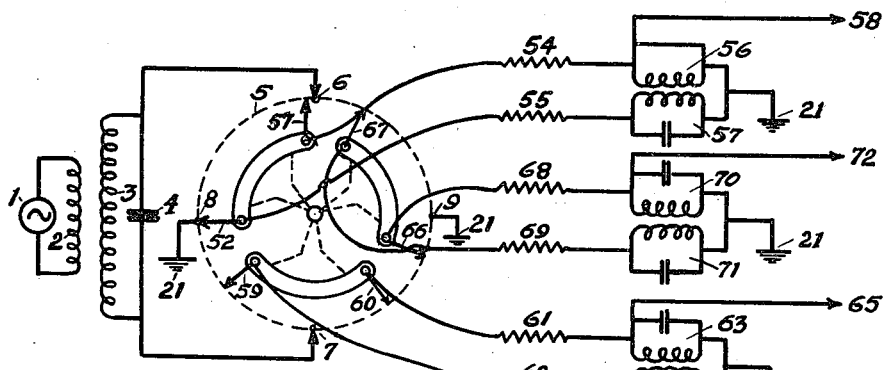
Figure 7:
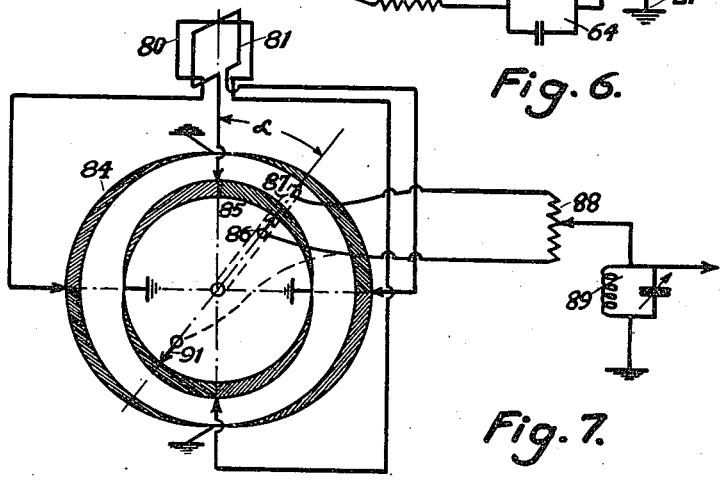
Figures 8, 9:
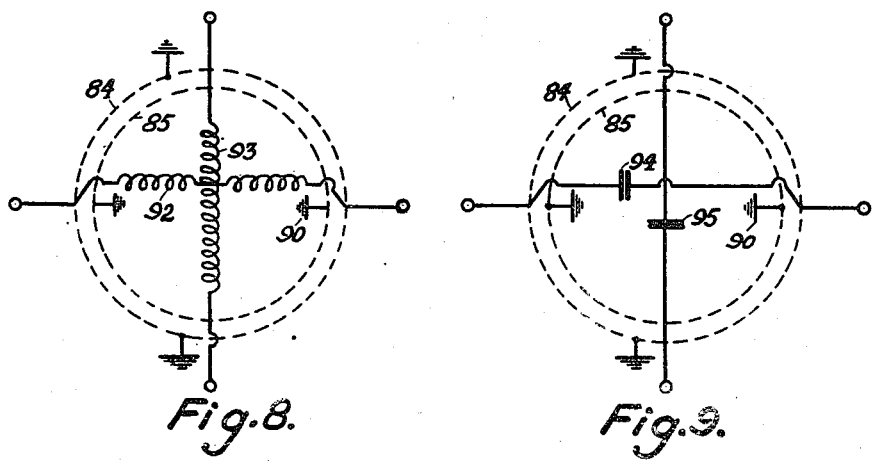

The above and further objects and novel aspects of the invention will become more apparent from the following detailed description taken with reference to the accompanying drawings forming part of this specification and wherein:

Figure 1 is a diagram showing the basic construction of a phase shifting system according to the invention, Figure 2 is a partial view illustrating the construction of an adjustable potentiometer for use in a system according to Figure 1, Figure 3 is a partial view showing a modified construction of a phase shift device according to Figure 1, Figure 4 is a complete diagram illustrating a system for comparing the phases of a pair of alternating currents or potentials, Figure 5 is a partial view illustrating a modification of Figures 1 and 4, Figure 6 shows a system for phase splitting constructed in accordance with the invention, Figure 7 illustrates a goniometer type directional radio system based on the principle of the invention, Figures 8 and 9 illustrate features of improvement of the system according to Figure 7.

Like reference characters identify like parts throughout the different views of the drawings.

Referring more particularly to Figure 1, item 1 represents a source of alternating currents which may be of low, medium or high frequency and are impressed by way of a resonant transformer comprising a primary 2 and a secondary 3, the latter being shunted by tuning condenser 4 upon one pair of diagonal points or apices 7 and 6, respectively, of a resistance bridge circuit 5 comprising in the example shown four substantially equal resistance units arranged in circular formation with the remaining opposite points or apices 8 and 9 connected to ground 21 or any other zero potential or reference point of the system. Item 10 represents a sliding contact arranged to be rotated through 360° cooperating with the resistances forming the bridge circuit.

If contact 10 is moved starting at point 6 in a clockwise direction, at first a maximum potential will appear between the contact and ground 21. When moving the contact away from point 6 the potential will decrease gradually and at point 9 will be equal to zero, then increases again with opposite sign or phase when the contact is moved further in clockwise direction until reaching a maximum of opposite polarity at point 7. If the contact is further rotated, the potential will again decrease to become zero at point 8 and resume its initial maximum after completion of a complete rotation at point 6. If the bridge circuit or potentiometer 5 is wound with a wire at constant pitch or if the resistance per unit length is constant, the curve representing the variation of the potential between the contact and ground as a function of the rotation α will be composed of positive and negative triangles due to the fact that the amplitude will be proportional to the angle α.

For many uses, in particular those described hereinafter, it is advantageous to construct the potentiometer resistance which may be in the form of a wire wound resistance or consisting of a strip of resistance material such as a carbon layer or the like in such a manner that the curve representing the variation of the resistance as a function of the angle α is a more or less pure sine and cosine wave, respectively. This may be accomplished in a simple manner such as shown in Figure 2 by reducing the cross-section from the points 6 and 7 towards the points 8 and 9 of a form upon which the wire resistance is wound, or alternatively, by employing a resistance strip such as a strip of fibrous material impregnated or coated with carbon or other resistive substance having a constant thickness but varying in width as shown in Figure 2. In the latter the radial distance between the inner circle and the outer curve indicates the resistance value at the respective angular positions of the contact 10. Many other methods of producing a varying resistance to obtain a sine wave characteristic will suggest themselves to those skilled in the art.

If a resistance of this type is employed in the arrangement according to Figure 1 and a constant direct voltage is impressed between the points 6 and 7 and if the sliding contact 10 is rotated from the point 6 through 360° an alternating voltage will appear between the sliding contact and ground having a frequency dependent on the speed of rotation of the contact as will be understood from the above. If the contact 10 is moved step by step a static curve can be plotted which with proper design of the resistance units in the manner described may be a pure sine or cosine wave, respectively. If, on the other hand, an alternating voltage is impressed between the points 6 and 7 and the sliding contact 10 rotated in the manner described, a modulated voltage will appear between the contact and ground having a frequency equal to the input frequency and an amplitude varying periodically dependent on the speed of rotation of the contact.

As is further shown in Figure 1, the contact 10 is connected to ground 21 by way of an impedance such as an ohmic resistance 12 and a parallel tuned resonant circuit comprising an inductance 14 shunted by a capacity 15 and an ohmic resistance 19. In addition to the contact 10 there is provided a similar contact 11 angularly displaced from the former by 90° and organically connected with by a common operating member, but electrically isolated from the contact 10. The contact 11 is similarly connected to ground 21 through an impedance such as a high ohmic resistance 13 and a resonant circuit comprising an inductance 16 shunted by a capacity 17 and an ohmic resistance 18. The inductances 14 and 16 are arranged in mutual coupling relation whereby the tuned circuits 14—15—19 and 16—17—18 form a converter for translating a pair of alternating currents or potentials of relatively varying amplitude into an output current or potential of substantially constant amplitude and varying phase in accordance with said relative amplitude variations. A converting circuit of this type is described in greater detail in my U. S. Patent 2,172,107 issued September 5, 1939.

In an arrangement described hereinbefore, the circuit 14—15—19 will be excited by an alternating potential having an amplitude proportional to cos α while the circuit 16—17—18 is excited by the same potential having an amplitude varying in accordance with sin α due to the 90° displacement of the contacts 10 and 11 as is understood from the above. Thus considering, for instance, circuit 14—15—19 the potential difference between point 20 and ground 21 may be expressed by the following theoretical equation well understood by those skilled in the art:

$$\frac{i_1}{wc} = \frac{E_1 R_2}{Z} \cos \alpha \sin wt + \frac{E_1 M w}{Z} \sin \alpha \cos wt \quad (1)$$

wherein $w$ represents the frequency in radians per second of the current supplied by the source 1, $c$ represents the capacity of condenser 15, $i_1$ the current in the circuit 14—15—19, $E_1 \cos \alpha \sin wt$ the potential exciting the circuit 14—15—19, $E_1 \sin \alpha \sin wt$ the potentials exciting the circuit 16—17—18. $R_2$ represents the total loss resistance of the circuit 16—17—18, M represents the mutual inductance between the coils 14 and 16, while Z is a constant depending upon various characteristics of the circuits.

If now $$\frac{E_1 R_2}{Z}$$

is made equal to $$\frac{E_1 M w}{Z} = H$$

then the current in the circuit 14—15—19 is found as follows:

$$\frac{i_1}{wc} = H[\cos \alpha \sin wt + \sin \alpha \cos wt] = H \sin [wt + \alpha] \quad (2)$$

From the latter equation it is seen that the phase angle of the potential between the output terminals 20—21 compared with the original phase between the points 7—6 is directly proportional to the angle α or angular displacement of the sliding contact 10.

In order to obtain a desired accuracy, it is necessary to design the potentiometer 5 with a suitable diameter practically about 7" for .1° accuracy, while the brush contacts 10, 11 should also be constructed with the requisite mechanical precision. All this is well known in the construction of potentiometer and resistance devices such as volume controls, etc., commonly used in the electrical and communication arts.

Bridge potentiometers of the aforedescribed type can be easily tested and checked by applying between the points 6 and 7 a direct voltage of known and constant value and by connecting high precision volt meters between each of the contacts 10 and 11 and ground. The static curve of the potentials as a function of the angle α plotted by rotating the contacts should then be an exact sine or cosine wave, respectively. In this manner any inaccuracy in the design can be easily detected and removed. After the static curve has been plotted, the potentiometer may be tested for low and high frequency currents for which it is designed. For this purpose a low or high frequency voltage of constant amplitude is applied between the points 6 and 7 and the alternating potentials between the contacts 10 and 11 and ground measured in a manner similar to that described above. Any inaccuracy due to self-capacity or self-inductance effects of the potentiometer may be ascertained in this manner and removed. In Figure 1 the potentials impressed upon the resonant circuits 14—15—19 and 16—17—18 are fed through the impedances 12 and 13 as pointed out. The resistances of the potentiometer units should be high due to the fact that these resistances are in shunt to the input circuit 3—4 whereby a low potentiometer resistance would result in an increased damping of the circuit. On the other hand, the two coupled circuits 14—15—19 and 16—17—18 tapped across the potentiometer constitute an increased load on the latter and consequently also on the circuit 3—4. In order to overcome this defect the coupled circuits 14—15—19 and 16—17—18 are connected through the high resistances 12 and 13, respectively, so as to reduce the load imposed by these circuits on the input to a negligible value. The resistances 12 and 13 could be omitted if the two coupled circuits 14—15—19 and 16—17—18 were fed through separate amplifying valves inserted at the points V and V'. In the latter case, any inaccuracy in the valve constants will affect the phase of the output potential between 20 and 21 and replacement of the valves will make necessary a rechecking and readjustment of the entire system. For this reason it may be desirable to use resistances 12 and 13 as shown and to amplify the output voltage between points 20 and ground 21. The resistances 19 and 18 shunting the tuned circuits serve to increase the damping of the circuits in order to compensate for slight phase differences due to inaccurate tuning of the circuits. By continuously rotating the contacts 10 and 11 at a definite frequency it is possible to obtain from a potential of fixed frequency applied to the circuit 4—5 a potential at point 20 which has a continuously shifting or rotating phase vector. This potential may be compared with another potential of relatively fixed phase proportional to any magnitude or condition to be detected by combining the potentials to energize a common indicator or translating device. Thus, the first potential may be derived from an open antenna and the second potential may be derived from a directional antenna system adapted to produce a potential or varying phase in proportion to the direction of an incoming signal. The combined effect of both potentials having a relatively fixed and rotating phase vector, respectively, may serve for direct indication of the direction of the received radio waves in a manner as described in greater detail in my co-pending application Serial No. 139,637 filed April 29, 1937.

As mentioned hereinabove and described in my Patent 2,172,107, the expressions given above with regard to the phase shift effected by the coupled circuits are accurate if both circuits are tuned to the frequency of the source 1. The mutual coupling between the coils 14 and 16 should be high and fulfill the following equation for most favorable operation:

$$\frac{E_1R_2}{Z} = \frac{E_1Mw}{Z} \quad (3)$$

Instead of providing resistances shunting the tuned circuits, the total loss resistance of the circuit may be kept high. The polarity of the mutual coupling between the circuits should be such that the phase of the potential between the points 20 and 21 is directly proportional to the angle $\alpha$ of rotation of the sliding contact 10. In this case, the phase angle in the second circuit 16—17—18 will be of opposite sign. If this is not the case, the coupling between the coils should be reversed such as by interchanging the terminal connection of one of the coils.

After the potentiometer or bridge circuit has been tested and adjusted as indicated hereinabove, the apparatus may be checked for accuracy of the phase angle between points 20 and 21 in the following manner: Since the phase angle of the circuit 14—15—19 should be proportional to the angle $\alpha$, the phase in the circuit 16—17—18 may be calculated, enabling in turn calculation of the amplitude of the potential difference between points V and V'. Thus, inserting a high resistance volt meter, such as a vacuum tube volt meter between the points V and V', the accuracy of the apparatus may be tested. If the results obtained are not in accord with the values calculated, the tuning adjustment, the coupling between the circuits or the resistances 18, 19 or 12, 13 are readjusted until the correct reading is obtained. If high precision measuring instruments are used for the checking and adjusting it is possible to obtain a phase shifting or control device of extremely high precision having the further advantage that the amplitude of the output potential is maintained at a constant value irrespective of the positions of both sliding contacts.

The potentiometer resistance may be made in any desired manner as previously explained in connection with Figure 2. A modified arrangement to obtain still greater accuracy is shown in Figure 3. According to this embodiment, small resistance units 5', 5'', 5''', etc., connected in series which may be of the wound or of any other type, are provided in place of a continuous resistance strip, the junction points of successive units being connected to stationary contacts spaced from each other at small angular distances, such as about 3° apart. The resistance elements are designed in such a manner as to obtain a desired resistance curve such as a sine or cosine curve in the manner described hereinbefore. In place of a single sliding contact as provided in Figure 1, twin contacts 10, 10' and 11, 11', respectively, are employed in this embodiment arranged to be connected across one resistance element at a time as shown. Each of the twin contacts are connected through a further resistance 23 and 24, respectively, a fixed or variable tap point of the latter being in turn connected to the contacts 10 and 11 in the manner understood from the diagram. The contacts 10, 10', 10'', resistance 23 and the contacts 11, 11', 11'', resistance 24 each form a mechanical unit, with both units rigidly connected for simultaneous rotation in a manner similar to that according to Figure 1. In this way decimals or even hundredths of a degree can be read thereby increasing the accuracy of the phase rotation or indication although requiring a special calibration chart for ascertaining the correct value for each position of the brushes 10', 10'' and 11', 11'', respectively.

Referring to Figure 4 which illustrates a complete phase comparing or measuring system, the voltages whose phases are to be compared, are applied to posts or input terminals 25—26 and 27—28, respectively. The first voltage, such as a voltage of varying phase to be determined, is transmitted by way of a transformer comprising a primary 30 and a secondary 31 to a potentiometer resistance 32 from which the voltage is impressed upon the potentiometric bridge 5 and twin-circuit phase shift system substantially similar to that shown in Figure 1. The phase shifted potential derived from the tuned circuit 14—15 is impressed upon the grid of an amplifying tube 34 provided with a grid biasing network of standard design 35 in its cathode circuit comprising a resistance shunted by a decoupling condenser. The amplified output potential is transmitted through transformer 36 and a volume control potentiometer 37 having an adjustable contact 38 upon a further amplifier shown by rectangle 39 to operate a translating device such as a pair of head phones or a volt meter 40. Before carrying out a measurement, the volume control 37 is set at the lowest level.

The other voltage, such as a standard voltage having a constant phase, is likewise fed through a transformer having a primary 41 and a secondary 42 to a double potentiometer or volume control resistance 43, 44 and impressed upon the input grid of an amplifying tube 45 provided with a grid biasing network 46 in its cathode lead similar to the network 35 for the tube 34. The amplified output potential is combined with the output potential of the amplifier 34 in the primary circuit of the transformer 36.

In order to determine the phase difference between the voltages, the sliding contacts 10 and 11 are rotated until the signal in the indicator 40 disappears. Then the volume control resistance 37 is increased and the output in 40 again brought to zero. In order to adjust both potentials to the same amplitude, the two potentiometers 32 and 43 are coupled mechanically for simultaneous adjustment. As will be obvious from Figure 4, when moving the contacts of the potentiometers 32 and 43 in an upward direction, the amplitude of the voltage applied to the bridge 5 is increased while the amplitude of the voltage applied to the resistance 44 is simultaneously decreased whereby the zero point; that is, when the amplitude of both potentials are exactly the same and their phases are 180° apart, can be easily found. As is understood, the direction of the windings 30 and 31 as well as that of 41 and 42 should be such that in case of zero phase shift and when the sliding contact is at point 6, the indicator response should be zero. Since the phase shift or measuring system described is based on a zero or null method, the measurements are of a very high precision provided that no other spurious relative amplitude changes or phase shifts occur between the input and output circuits.

The phase control system has been described for a single or fixed frequency. If it is desired to use the instrument for more than one frequency, this may be accomplished by the provision of tunable coupled circuits 14—15—19 and 16—17—18, respectively. This is shown in Figure 5 by ganging the tuning condensers 15 and 17 and the resistance 18 and 19 to be adjusted by a common operating member as indicated at 47 in such a manner as to maintain the requisite relationship:

$$\frac{E_1 R_2}{Z} = \frac{E_1 M w}{Z}$$

for all the frequencies within a desired measuring range. In this case it is further advantageous to provide aperiodic input circuits and amplifiers although tuned input circuits may be used which have to be carefully designed in order to prevent additional phase shifts due to incorrect ganging or tuning. The aforementioned difficulties of ganging, etc., can be avoided by arranging the entire system in the intermediate frequency section of a superheterodyne amplifier in which case a common oscillator may be provided to supply both frequency changing or mixer valves serving to transform the frequencies of the potentials to be compared into potentials of a fixed predetermined different frequency having the same phase relation as the original potentials, as is well understood by those skilled in the art.

A system according to Figure 4 is also well suited for determining the direction of an incoming radio signal by impressing upon one pair of input terminals such as 25—26 a signal potential having a phase being proportional to the incoming direction of the signal and impressing upon the other input terminal 27—28 a potential derived from the same incoming signal but having a fixed phase. Thus, the first potential may be produced by a crossed-loop intercoupled system and the second potential absorbed by an open antenna as described in my above mentioned copending application. By comparing the relative phase between the potentials, the direction can be determined and directly read by calibrating either of the contacts or a suitable pointer associated therewith directly in directions of propagation or angular deviation from a given fixed direction.

Referring more particularly to Figure 6, there is shown an embodiment of the invention for splitting a potential or current of given phase into a plurality of components of predetermined relative phase difference from each other. In the example shown three phases are provided derived from a single phase, for which purpose, in place of a single twin circuit, three twin circuits are shown tapped across the potentiometer bridge in such a manner that the phase of source 1 is converted into a three-phase potential derived from points 58, 72, 62. The twin circuits 56—57, 70—71 and 63—64 are energized through resistances 54—55, 68—69 and 61—62, respectively, by way of slide contacts 51—52, 66—67, 59—60, respectively. Corresponding contacts are spaced by an angle of 60° and all the contacts are arranged to be fixed and/or adjusted simultaneously in such a manner that a three-phase current or potential may be derived from the output circuits 63, 70 and 65.

Referring to Figure 7 there is shown an embodiment of the invention as applied to a radio direction finding receiver or transmitter of either the Marconi-Bellini-Tosi or Marconi-Adcock type. In this embodiment items 80 and 81 represent a pair of crossed loop aerials which however may be replaced by any other type of antennae having "Figure of Eight" directional patterns; i. e. where the signal response is proportional to the sine or cosine of the angle between the incoming signal direction and a fixed directional line such as a pair of open wire antennae according to Marconi-Adcock. Each of the antennae is connected to a potentiometric bridge device of the type according to the invention in the manner shown and understood from the above. Both potentiometric bridges are arranged with their resistance characteristics or curves having a relative 90° phase position as indicated by the shaded areas and understood from the preceding description. In this manner the resistance between the sliding contacts 86 and 87 associated with each of the potentiometric bridges and ground varies in accordance with a sine or cosine law as a function of the angle α of rotation of the brushes or contacts. The brushes 86 and 87 which are electrically isolated are connected through an impedance such as ohmic resistance 88, the latter being sufficiently high so as not to impose any appreciable load upon or cause coupling between the crossed loop aerials. The center point of this resistance is connected to a wireless receiver or transmitter of any suitable type of which only the tuned circuit 89 is shown in the drawings. The latter may be the output circuit of a transmitter or the input circuit of a receiver as is understood.

An arrangement as described constitutes a resistance goniometer which is substantially equivalent to the inductive or search coil goniometer of the type known in the art. Assuming that a signal arrives under a certain angle $\beta$ with respect to zero line of both loops or Adcock aerials. In this case the potentials induced by an incoming radio signal in the aerials 80 and 81 may be expressed as follows:

E cos $\beta$. sin $wt$ in aerial 80
—E sin $\beta$. sin $wt$ in aerial 81

The potential between the sliding contact 87 and ground will then be equal to E cos $\beta$. cos $\alpha$. sin $wt$ and the potential between contact 91 opposite to contact 86 and ground will be $-E \sin \beta \sin \alpha \cdot \sin wt$ as follows from the above. Both potentials are simultaneously impressed upon the circuit 89 so that the resultant potential developed will be equal to $$e = E \cos \beta \cos \alpha \sin wt$$
$$- E \sin \beta \sin \alpha \sin wt$$
$$= E [\cos (\alpha + \beta)] \cdot \sin wt$$

From this expression it follows that by rotating simultaneously the contacts 86 and 87 maximum signal either positive or negative will correspond to the true direction and a minimum or extinction of the signal will correspond to an incoming signal at right angle to this direction provided a proper orientation of the goniometer relative to the orientation of the directional antennae. The same effect is obtained by connecting the contacts 87 and 91. Either of the pairs of contacts 91 and 87 or 86 and 87 may be used, this depending upon the mutual direction of the windings in the crossed loop aerials. A weakening of the signal due to the resistance of the bridge and the resistance 88 may be offset by adding one or more stages of amplification in the circuits connected to the goniometer system. The latter has the advantage over the known inductive goniometers of great simplicity and increased accuracy as will be obvious from the above. In order to increase the signal strength, parallel inductances 92, 93 as shown in Figure 8 or parallel capacities 94, 95 as shown in Figure 9 may be provided.

As shown hereinbefore and in the diagrams, the potentiometric bridge is advantageously of circular shape with the contacts arranged for rotation in the manner described. As is understood, any other arrangements may be used to obtain the results according to the invention. Thus for instance, the two arms of the potentiometric bridge may consist of flat strips or wires of resistance material connected in such a manner as to form a bridge circuit similar to that described above. The sliding contacts in this case would no longer be of the rotating type but rather slide along a straight path.

It will be obvious from the foregoing that the invention is not limited to the specific details and arrangement of parts shown and described herein for illustration, but that the novel principle and underlying idea disclosed is susceptible of numerous modifications and variations coming within the broader scope and spirit of the invention as defined in the appended claims. The specification and drawings are to be regarded in an illustrative rather than a limiting sense.

I claim:

1. A potentiometric system comprising four substantially equal resistance units connected to form a bridge circuit, means for applying an input voltage between one pair of diagonal apices of said bridge, the remaining apices being connected to the zero potential point of said system, a movable contact arranged to progressively engage said resistance units in succession, an output circuit connected between said contact and the zero potential point, said resistance unit being of non-uniform design to obtain a substantially sinusoidal amplitude variation of the voltage in said output circuit by a complete movement of said contact along said resistance units.

2. A system as claimed in claim 1, wherein said resistance units are arranged in circular formation and said contact is arranged for rotation about a central axis of the units.

3. A system as claimed in claim 1, wherein said resistance units are comprised of a wire wound with substantially equal pitch upon a circular form of decreasing cross-section from the first pair of opposite apices of said bridge towards the other apices and said contact is arranged for rotation about a central axis.

4. A system as claimed in claim 1, wherein said resistance units are comprised of a wire wound upon a circular form having a progressively changing pitch from one pair of opposite apices towards the other apices of said bridge and said contact is arranged for rotation about a central axis.

5. A system as claimed in claim 1, wherein said resistance units are comprised of arcuate strips of resistance material forming a circular resistance of progressively decreasing width from one pair of opposite apices towards the other apices of the bridge and said contact is arranged for rotation about a central axis.

6. In a phase shifting system, a potentiometric device comprising four substantially equal resistance units connected to form a bridge circuit, means for applying an alternating input voltage between one pair of opposite apices of the bridge, the remaining apices being connected to the zero potential point of said system, a pair of contacts spaced at a distance substantially equal to the lengthwise dimension of said resistance units, said contacts being relatively fixed and arranged for simultaneous movement to progressively engage said resistance units in succession, a pair of output circuits connected between each of said contacts and said zero potential point, said resistance units being of unequal design to effect substantially sinusoidal amplitude variations in quadrature relation of the voltages in said output circuits by a complete movement of said contacts along said resistance units, and means for converting the output voltages of varying amplitude into at least one voltage of substantially equal amplitude and varying phase position corresponding to said relative amplitude variations.

7. A system as claimed in claim 6, wherein said last means comprises a pair of reactively coupled resonant circuits tuned to the frequency of said input voltage and each connected in one of said output circuits, and means for utilizing the voltage developed by at least one of said resonant circuits.

8. A system as claimed in claim 6, said last means comprising a pair of substantially equal and inductively coupled resonant circuits both tuned to the frequency of said input voltage and each connected in said output circuit, the mutual coupling impedance between said resonant circuits being substantially equal to the non-reactive impedance of either resonant circuit, and means for utilizing the voltage developed by at least one of said resonant circuits.

9. In a phase measuring system, a potentiometric device comprising four substantially equal resistance units connected to form a bridge circuit, means for applying an alternating input voltage of varying phase between one pair of opposite apices of the bridge, the remaining apices being connected to the potential reference point of said system, a pair of movable contacts spaced at a distance substantially equal to the lengthwise dimension of said resistance units and arranged for simultaneous movement to progressively engage said resistance units in succession, a pair of output circuits connected between each of said contacts and said reference points, said resistance units being of unequal design to effect substantially sinusoidal amplitude variations in quadrature relation of the voltages in said output circuits by a complete movement of said contacts along said resistance units, means for converting the output voltages of varying amplitude into a voltage of substantially equal amplitude and varying phase corresponding to said relative amplitude variations, and further means for combining said last voltage with a voltage of fixed phase relation.

10. In a phase shifting system, a potentiometric device comprising four substantially equal resistance units connected to form a bridge circuit, means for applying an alternating voltage of varying phase between one pair of opposite apices of said bridge, the remaining apices of said bridge being connected to the potential reference point of said system, a plurality of contacts spaced at a predetermined distance and arranged to engage predetermined points of said resistance units, output circuits connected between each of said contacts and said reference point, said units being designed so that the resistance varies non-linearly according to a sinusoidal function from one apex to the opposite apex of the bridge circuit, and means for converting the voltages developed in said output circuits of different amplitude into voltages of substantially equal amplitude and varying relative phase corresponding to the respective amplitude relations.

JOZEF PLEBANSKI.